US012284319B2

(12) United States Patent
Chavez

(10) Patent No.: US 12,284,319 B2
(45) Date of Patent: Apr. 22, 2025

(54) CONTACT CENTER CONTINUOUS AVATAR VISUAL EXPERIENCE

(71) Applicant: Avaya Management L.P., Durham, NC (US)

(72) Inventor: David Chavez, Broomfield, CO (US)

(73) Assignee: Avaya Management L.P., Durham, NC (US)

(*) Notice: Subject to any disclaimer, the term of this patent is extended or adjusted under 35 U.S.C. 154(b) by 0 days.

(21) Appl. No.: 17/733,734

(22) Filed: Apr. 29, 2022

(65) Prior Publication Data

US 2023/0353677 A1 Nov. 2, 2023

(51) Int. Cl.
*H04M 3/00* (2024.01)
*H04M 3/493* (2006.01)
*H04M 3/51* (2006.01)
*H04M 3/523* (2006.01)

(52) U.S. Cl.
CPC ....... *H04M 3/5237* (2013.01); *H04M 3/4936* (2013.01); *H04M 3/5175* (2013.01); *H04M 2203/404* (2013.01)

(58) Field of Classification Search
CPC . H04M 3/5237; H04M 3/4936; H04M 3/5175
See application file for complete search history.

(56) References Cited

U.S. PATENT DOCUMENTS

| 8,634,543 | B2 | 1/2014 | Flockhart et al. |
| 9,105,013 | B2 | 8/2015 | Chavez |
| 10,205,999 | B2 | 1/2019 | Chavez |
| 10,354,256 | B1 | 7/2019 | McInerny |
| 11,200,742 | B1 | 12/2021 | Post et al. |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2014/0245192 | A1 | 8/2014 | Chavez |
| 2014/0365971 | A1* | 12/2014 | Laadan ............ G06F 3/04842 715/835 |
| 2019/0205727 | A1* | 7/2019 | Lin .................. G06N 5/00 |
| 2020/0302263 | A1* | 9/2020 | Douek ............. G06N 20/00 |
| 2022/0200936 | A1* | 6/2022 | Higgins .......... G06N 20/00 |
| 2022/0343250 | A1* | 10/2022 | Tremblay ....... G06Q 10/06316 |

* cited by examiner

*Primary Examiner* — Rasha S Al Aubaidi
(74) *Attorney, Agent, or Firm* — Sheridan Ross P.C.

(57) ABSTRACT

Customer interactions with a remote contact center can be disjointed and confusing, especially when a customer is transferred from agent to agent. By maintaining a persona of the agent first encountered by a customer while the interaction transitions to other agents (artificial and/or live), the customer interaction may progress more naturally and without the customer being distracted by the transfer to a new agent. By configuring artificial agents with the first persona or deploying a server to perform persona-alterations of a live agent, the customer may never be aware that they have been transferred away from the first agent they encounter and the customer interaction proceeds efficiently and effectively.

20 Claims, 6 Drawing Sheets

CONTACT CENTER CONTINUOUS AVATAR VISUAL EXPERIENCE

FIELD OF THE DISCLOSURE

The invention relates generally to systems and methods for communication management and particularly to harmonizing disparate agents to a customer during a communication.

BACKGROUND

Contact center interactions with customers can often be disjointed. For example, a customer may initially interact with an interactive voice response (IVR) tree, then interact with an artificial agent (or "bot"), and then be transferred to a human contact center agent (or "live agent"). Experiences with disparate channels can lead to customer frustration and errors which can result in wasted networking, computing, and human resources. Even when the content of such communications is the same, the presentation may end in different perceptions and, as a result, the customer may perceive a different meaning or require additional clarification, further burdening the systems utilized in maintaining the interaction.

SUMMARY

Prior art contact centers often utilize bots to engage in an initial interaction with a customer. This initial interaction with a bot is used to gather basic or commonly required information, such as the customer's name, problem or issue that needs addressed, etc. These bots are often given a name and/or other attributes specifically designed to appeal to the demographic of the customer (whether the demographic is known or estimated). For example, the bot may be named "Bella" in order to appeal to a demographic group known to or believed to comprise the customer. The customer, Sally, asks (texts) bot Bella a question. Bot Bella gives (texts) Sally a preprogrammed or "canned" response which may or may not address Sally's question. Depending on the bot's capabilities, such as the power and configuration of the artificial intelligence (AI) utilized to drive responses, Bella may be able to answer Sally's question or resolve an issue. If not, Sally may become mad or frustrated as a result. The underlying AI may be able to detect the customer's emotional state and/or the absence of progress in resolving the customer's issue and, therefore, transfer the communication to another agent. When transferred to another agent, the customer has to re-initiate the social norms and other interactions to interact with the new agent.

While many interactions may be successfully resolved with a bot alone, such as when the issue is the exchange of easily identified and provided information (e.g., "What is my account balance?"), other customer interactions are more complex or otherwise require skills beyond those of automated systems. These more complex issues may require human involvement, especially when the bot, when acting alone, is unable to resolve the issue. This may be due to communication issues, understanding issues, authorization issues (e.g., ability to approve a refund), encountering an issue for the first time, etc. When a customer is transferred from one agent (such as a bot) to another agent (such as a human), the transfer may be disruptive and counterproductive to resolving the issue. This can be particularly confusing and distracting if the bot is a convincing human facsimile that was believed to have the skills necessary to resolve the customer's issue, commonly referred to as an "avatar."

These and other needs are addressed by the various embodiments and configurations of the present invention. The present invention can provide a number of advantages depending on the particular configuration. These and other advantages will be apparent from the disclosure of the invention(s) contained herein.

Embodiments herein are generally directed to interactions that comprise a plurality of resources, human and/or artificial, each with their own appearance and persona. The portion of the interaction provided by the resource is modified so that an avatar presents and maintains a consistent appearance to the customer. In one embodiment, a consistent avatar is maintained throughout the interaction with the customer, even while the inputs to the avatar transition between an artificial resource to a live agent, between different artificial systems, and between different live agents. The avatar maintains appearance in terms of physical, audible, contextual, and/or other appearances.

Exemplary aspects are directed to:

A system for harmonizing a communication, comprising:
a network interface to a network;
a processor with instructions maintained in a non-transitory memory; and
wherein the processor performs:
  generating, by a first artificial agent, a first communication content and transmitting the first communication content, via the network, as a first portion of an interaction with a customer device utilized by a customer and wherein the first communication content comprises substantive content and a first persona;
  during the interaction, determining the first automate agent is unable to successfully address a work item to be addressed during the interaction and, in response, transferring the interaction to a second agent;
  generating, by the second agent, a second communication content as a second portion of the interaction and wherein the second agent generates the second communication content comprising a second persona; and
  altering the second communication content to comprise to comprise the first persona and transmitting the second communication content, via the network, comprising the first persona to the customer device.

A method for harmonizing a communication, comprising:
generating a first communication content and transmitting the first communication content, via a network, as a first portion of an interaction with a customer device utilized by a customer and wherein the first communication content comprises substantive content and a first persona;
during the interaction, determining the first automate agent is unable to successfully address a work item to be addressed during the interaction and, in response, transferring the interaction to a second agent;
generating, by the second agent, a second communication content as a second portion of the interaction and wherein the second agent generates the second communication content comprising a second persona; and
altering the second communication content to comprise to comprise the first persona and transmitting the second communication content, via the network, comprising the first persona to the customer device.

A system, comprising:
means to generate a first communication content and transmitting the first communication content, via a network, as a first portion of an interaction with a customer device utilized by a customer and wherein the first communication content comprises substantive content and a first persona;

means to, during the interaction, determine the first automate agent is unable to successfully address a work item to be addressed during the interaction and, in response, transferring the interaction to a second agent;

means to generate, by the second agent, a second communication content as a second portion of the interaction and wherein the second agent generates the second communication content comprising a second persona; and means to alter the second communication content to comprise to comprise the first persona and transmitting the second communication content, via the network, comprising the first persona to the customer device.

Any of the above aspects:

Wherein the first persona differs from the second persona in at least a physical appearance in a video portion of the second communication content.

Wherein the physical appearance is a gesture.

Wherein the first persona differs from the second persona in at least a pattern of speech in an audio portion of the second communication content.

Wherein the first persona differs from the second persona in at least a word chose to express a meaning as a portion of the second communication content.

Wherein the first persona differs from the second persona in at least a vocalized utterance in an audio portion of the second communication content.

Wherein the first persona is maintained as a data structure maintained in a data storage.

Wherein the processor configures a second system hosting the second agent with the first persona.

Wherein the second agent comprises at least one of audio and video signals generated from a corresponding at least one of speech and physical presence of a live agent.

Further comprising: means to maintain the first persona in a data storage; and wherein the means to configure a server executing the second communication content with the second persona and alter the first persona to comprise the second persona.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
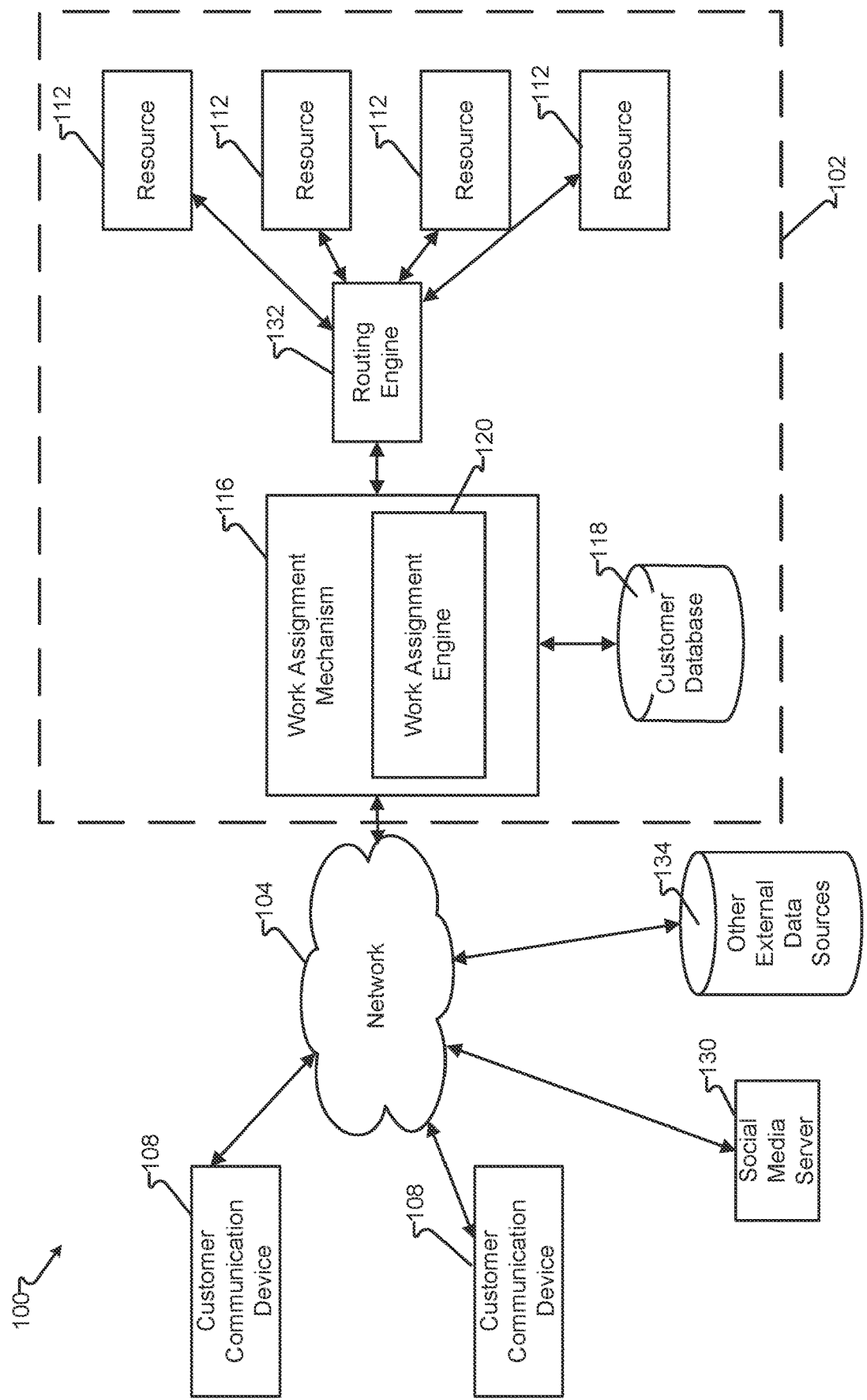
FIG. 1 depicts a system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are themselves, or associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other components may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134, may be within contact center 102 physically and/or logically, but still be considered external for other purposes (e.g., system administration). For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through various telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to a particular customer(s). In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 includes, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely artificial resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received via communication network 104 at work assignment mechanism 116. The message received by a contact center 102, such as at the work assignment mechanism 116, is generally, and herein, referred to as a "contact." Routing engine 132 routes the contact to at least one of resources 112 for processing.

Embodiments herein are generally directed to connecting a customer to two or more agents (each a resource 112) and presenting the second agent (or subsequent agents) to the customer with a persona that mimics the persona of the initial agent. In one embodiment, the agent first encountered by the customer performs an initial assessment of the contents of the communication, such as to determine a work item associated with the communication, other resources that may be needed, authenticating the customer, or other gathering of basic information (e.g., identity of the customer, purchase order, account number, etc.). In certain circumstances, the initial agent may be able to successfully resolve the work item, such as when the work item is limited to the customer requesting readily determined and provided information (e.g., "What is my account balance?"). However, in many situations, the system utilized to provide an artificial agent to the customer during the first part of a communication is unable to address all work items, if any. Therefore, routing engine 132 and/or other routing may enqueue or connect the communication to another agent (a different one of resource 112).

The initial agent may not be able to successfully address the work item for any one or more reasons, such as an inability to determine the customer's request, the need for another agent to authorize an action, an absence of required information that is available to another agent, or other reason(s). Agents may be live agents or artificial. Artificial agents may have varying degrees of sophistication, from a simple IVR or dual-tone multifrequency (DTMF) selection (e.g., "Press or say '1' for account balance." "Press or say '2' for recent transactions." etc.), to more elaborate programmed logic, to codeless artificial intelligence (AI) agents that utilize trained neural networks to interact in a human-like manner with the customer.

A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Each resource 112, whether a live agent, IVR/DTMF option selection, AI, or other form, have their own persona. As used herein, bot, avatar, and artificial agent may be utilized interchangeably to describe computing hardware having one or more processors executing instructions to generate communication content for presentation to a remote customer and receiving communication content therefrom. Generally, but without limitation, a bot may be a "chat bot" and communicate textually without audio (speech) or video. Whereas an avatar may comprise functionality to generate and present speech, and receive and understand speech from the customer. An avatar may be presented, in part, via video image, such as an animation, animated human, or overlay onto an image of a human so as to present the avatar as a visual image to the customer.

A persona is variously embodied and, as used herein, includes any one or more of personality, appearance (visually and/or audibly), mannerisms, expressions, utterances, means of interacting, and/or other attribute—whether or not the customer is consciously aware of such attribute—when presented to customer communication device 108 by a component of contact center 102.

In one embodiment, a persona comprises a visual appearance as presented to customer communication device 108 when the interaction with the customer, via network 104, comprises video. Visual appearance is variously embodied and includes any one or more visual attributes associated with a particular gender, age, nationality, ethnicity, social status, emotion, and/or appearance of clothing, jewelry, assistance devices (e.g., eyeglasses, visible hearing aids, etc.), gestures, expressions, and/or other aspect that a customer is capable of perceiving when viewing a display device of customer communication device 108.

In another embodiment, a persona comprises patterns of speech as presented to customer communication device 108 when the interaction with the customer comprises audio. Patterns of speech are variously embodied and may include pace, timbre, tone, pitch and may further indicate a particular gender, age, nationality, ethnicity, social status, emotion, and/or other aspect that a customer is capable of audibly perceiving when presented on a speaker of customer communication device 108. Additionally or alternatively, the patterns of speech may include a particular word or phrasing choice, for example to convey formality versus informality or other personal attribute by saying (e.g., generating speech) comprising "yeah" versus "yes". Similarly, the generated speech may address the customer generically (i.e., "you"), informally by name (e.g., "Bob"), formally by name (e.g., "Mr. Smith"), and/or other word/phrasing choice to convey a particular attribute of the artificial agent. Patterns of speech may also include other vocalized utterances, such as humming while waiting, saying non-word acknowledgements ("hmm", "ah", "yep," etc.), etc.

While, in some embodiments, persona may be mere appearance, whether visually or audibly, in other embodiments, the persona may be operational. For example, a first system (e.g., IVR) may give the customer an operational option (e.g., "To go back say, 'back' or press 1" "To select another option say, "main menu' or press 0", etc.). The interaction may be transitioned to a second system, which may have an operational persona that presents different options (e.g., "To go back say, "go back' or press the star key." "To select another option say, 'home' or press 9", etc.). Accordingly, the persona of one artificial agent may be different with respect to the operational commands utilized by a different artificial agent, even though the meaning is the same (e.g., "go back").

A first (or previously) encountered agent persona is often preferred to be maintained when the customer is transitioned to a second (or subsequent) agent which typically transfers the customer from one system to another system (bot to bot), from a bot to a live agent, or from one live agent to another live agent, which may have initially utilized a bot. If the persona is maintained, the customer is not confused by the transition to a new agent and may not be aware, and need not be notified, of the transition. For example, a customer interacting with one system, as presented to the customer as a first bot, may learn how to interact with the first bot (e.g., "1" goes back) and may be confused when transferred to a second system, as presented to the customer as a second bot, which may have different means of interacting (e.g., "*" goes back). Accordingly, portions of the second interaction are altered by adding, removing, and/or changing portions thereof that convey a presence or meaning in a second persona so as to convey the same presence or meaning even if the underlying bot has changed.

Figure 2:
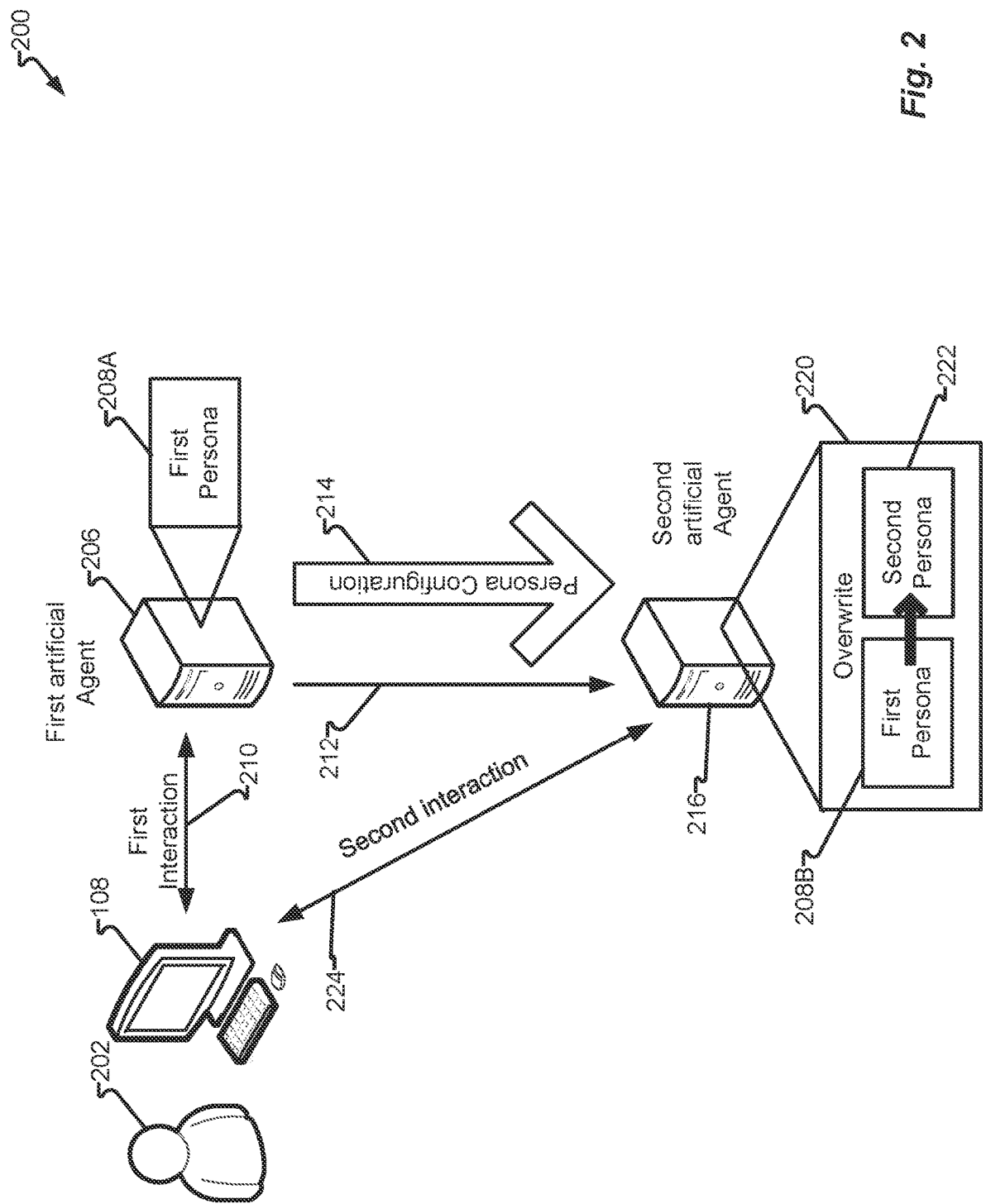
FIG. 2 depicts a system in accordance with embodiments of the present disclosure.

FIG. 2 depicts system 200 in accordance with embodiments of the present disclosure. In one embodiment, customer 202 utilizes customer communication device 108 to conduct first interaction 210 with first artificial agent 206 (an artificial resource 112) via network 104 (see FIG. 1). First artificial agent 206 presents itself to customer 202 with first persona 208A. As described more completely above, first persona 208A may comprise a particular audible presentation (e.g., word usage, inflections, accent, etc.) when first interaction 210 includes audio or a particular appearance (e.g., age, gender, hair style, gesture, expression, etc.) when first interaction 210 includes video. In another embodiment, first interaction 210 may include, or consist entirely of, text. Accordingly, first persona 208A may be limited to textual representations, such as word choice, phrasing, punctuation use or misuse, emojis, and/or other content capable of being expressed via textual content on customer communication device 108.

In one embodiment, customer 202 contacts or is contacted by contact center 102 comprising first artificial agent 206. For example, customer 202 may inquire about an account balance when first artificial agent 206 is a portion of contact center 102 providing banking services. First interaction 210 may include prompts utilizing first persona 208A for presentation on customer communication device 108, such as to identify customer 202 (e.g., username, password, account number, etc.). First artificial agent 206 may be limited in functionality, such as to be able to address simple questions or make a routing decision which may be made by first artificial agent 206 alone by, or in conjunction with, routing engine 132, work assignment mechanism 116, work assignment engine 120, and/or other components. Customer 202 may utilize first interaction 210 to indicate a work item, for example, a request to obtain information.

In one non-limiting example, customer 202 may speak, type, select, or otherwise request information, such as "What is my account balance?" First artificial agent 206 makes a determination as to identifying the request and how to respond, which may include accessing information from other data repositories (e.g., customer database 118 and/or other data sources) in order to obtain the answer. First artificial agent 206 then configures a response to deliver the answer utilizing first persona 208A to customer 202, such as to generate speech, "Your account balance is negative one-hundred thirty-two dollars and ninety-three cents," when first interaction 210 is limited to audio. When first interaction 210 includes video, first persona 208A may comprise an avatar generating mouth and facial movement to "speak" the response and/or show other meaning, such as concern or surprise and/or provides a different word choice (e.g., "Oh, sorry. It looks like you are overdrawn. Your balance is −$132.93.").

First artificial agent 206 may then present customer 202 with options to continue the interaction with another resource 112, which may not be apparent to customer 202. For example, the interaction as presented to customer 202 may simply continue. Customer 202 may provide speech in an audio portion of first interaction 210 (e.g., "That can't be right!"). First artificial agent 206 may then respond with an acknowledgement (e.g., "OK, let's look into it." "Let me pull up your recent transactions.")—which may cause other systems of contact center 102 to create a new work item (i.e., "resolve overdraft issue") to be addressed and routed to different systems utilizing different agents. As a result, and unknown to customer 202, first artificial agent 206 executes transfer 212 of the current work item or new work item to second artificial agent 216. As a portion of transfer 212, persona configuration 214 is transferred to second artificial agent 216.

Persona configuration 214 is variously embodied. In one embodiment, first persona 208A is copied to second artificial agent 216 to overwrite second persona 222 and become first persona 208B. In another embodiment, first persona 208A may be maintained in a data storage accessible to both first artificial agent 206 and second artificial agent 216, and persona configuration 214 comprises the passage of a memory address, network address, or other location indicia of first persona 208A. In another embodiment, copies of first persona 208 may be maintained in data structures as separate instances, namely first persona 208A and first persona 208B, wherein persona configuration 214 comprises an indicia of the persona utilized, such as when one of a number of personas are utilized during first interaction 210. Accordingly, persona configuration 214 may comprise a data structure or message identifying the specific persona utilized to cause second artificial agent 216 to select the same persona (i.e., first persona 208B) in place of its own persona (i.e., second persona 222).

Second artificial agent 216 may comprise or have access to additional information not available to first artificial agent 206 (e.g., transactions, images of checks, account log-ins, etc.) in order to be able address the work item, generally referred to as "back-end systems". The back-end systems may comprise additional information, such as may be utilized to determine the events that lead to a negative account balance for customer 202, in the above example. Therefore, second artificial agent 216 conducts second interaction 224 with customer 202 via customer communication device 108 and utilizes first persona 208B. As a benefit, customer 202 is provided with the appearance of a single agent (e.g., first artificial agent 206) even though first interaction 210 has concluded and transitioned to second interaction 224 with second artificial agent 216.

It should be appreciated that more than one transfer may occur. Continuing the above example, there may be many reasons why an account may be overdrawn, including account holder's mistake, duplicated transaction, absent deposit, and fraud. Each potential reason may require actions by a different agent. For example, artificial agents trained to identify and resolve fraudulent transactions may be presented to customer 202 as the same initial agent via configuring or otherwise providing first persona 208A to each of the subsequent artificial agents. However, certain embodiments of contact center 102 may cause an interaction with a customer to be transferred to a live agent (see FIG. 3).

Figure 3:
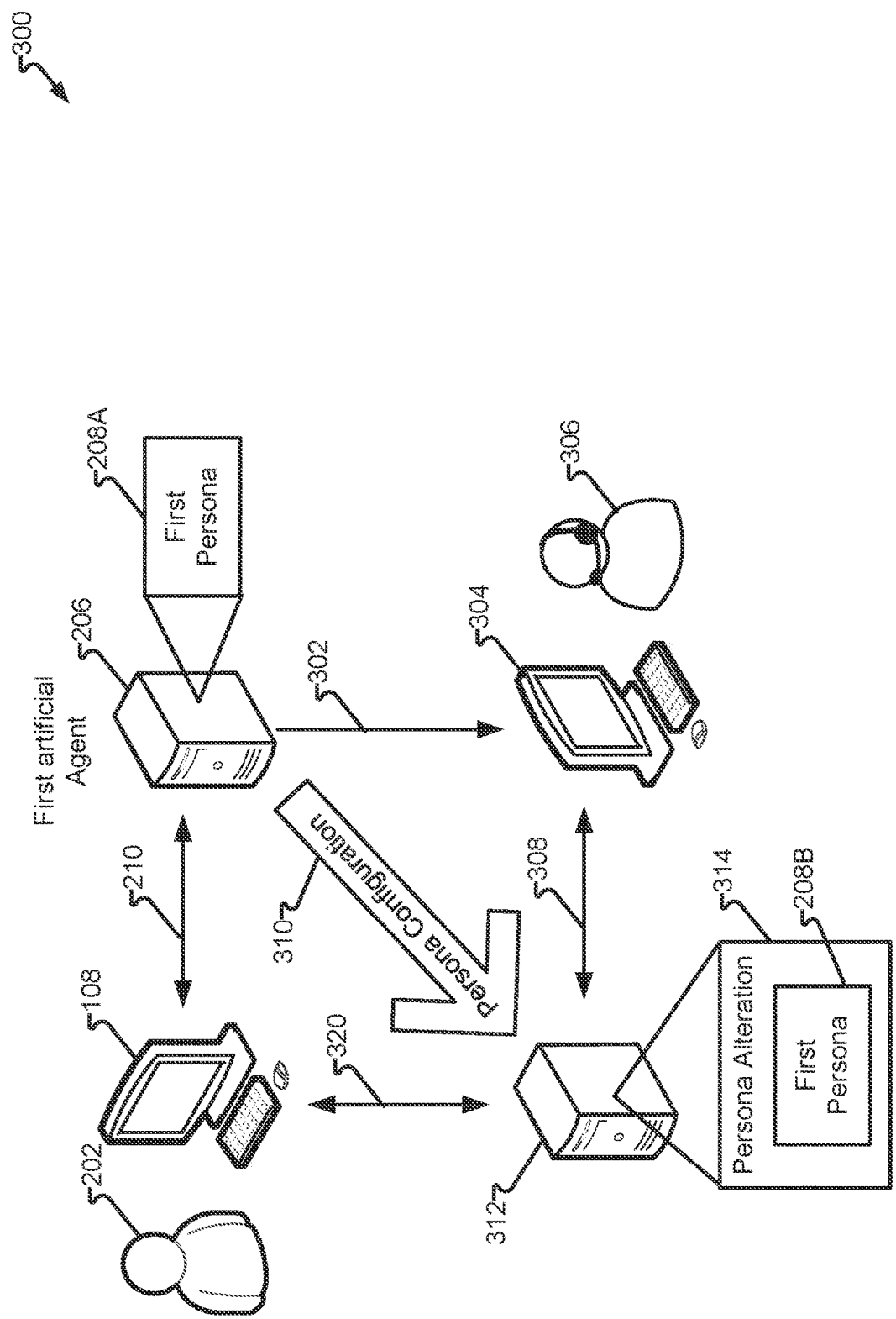
FIG. 3 depicts a system in accordance with embodiments of the present disclosure.

FIG. 3 depicts system 300 in accordance with embodiments of the present disclosure. In one embodiment, customer 202 utilizes customer communication device 108 to conduct first interaction 210 with first artificial agent 206 (an artificial resource 112) via network 104 (see FIG. 1). First artificial agent 206 presents itself to customer 202 with first persona 208A. During first interaction 210 a condition may occur that requires first artificial agent 206 to transfer the interaction to another agent. The condition precipitating the transfer may be an explicit request by customer 202 (e.g., pressing a DTMF key associated with "live agent", verbally requesting an agent, requesting an action (work item) known to require a live agent, etc.) or detected condition (e.g., customer 202 is requesting a refund that exceeds the authority of first artificial agent 206, stalled progress, frustration, anger, etc.) that is known to require a live agent.

Similar to system 200 (see FIG. 2), first interaction 210 with first artificial agent 206 utilizes first persona 208A and, at some point later, transfer 302 transfers the interaction to live agent 306 utilizing agent communication device 304. Agent communication device 304 may be enabled for one or more of video, audio, and text communications with customer communication device 108 via network 104 (see FIG. 1). Live agent 306 inherently has certain persona attributes (e.g., age, gender, clothing, etc.) that, at least within the scope of a particular interaction, are immutable, and some persona attributes may be selectively customized (e.g., alter their pattern of gestures, talk faster, talk at lower tone, etc.). Persona configuration 310 therefore configures server 312 to receive interaction comprising native and/or mutable persona 308 from agent communication device 304 and applies first persona 208B via persona alteration 314, a process executing on at least one processor of server 312.

Server 312 executing persona alteration 314, as determined by first persona 208, may alter the physical appearance, pattern of speech, word choice, etc., provided during interaction comprising native persona 308 for presentation in second interaction 320. Therefore, customer 202 receives no (or at least fewer) cues that first interaction 210 with first artificial agent 206 has transitioned to second interaction 320 with live agent 306.

If second interaction 320 successfully concludes the work item then the communication between customer communication device 108 and agent communication device 304 (and/or other component of contact center 102) may be terminated. However, it should be appreciated that a subsequent transfer to an artificial or another live agent may be performed, such as to provide first persona 208 to a subsequent artificial agent or server (such as server 312) to cause the subsequent resource to utilize first persona 208 and maintain the facade that the interaction remains with first artificial agent 206.

Figure 4:
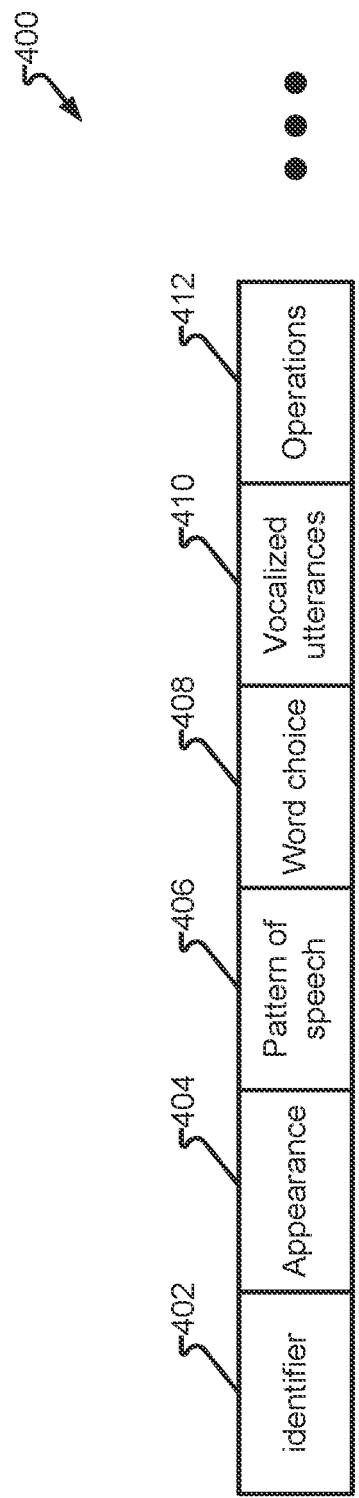
FIG. 4 depicts a data structure in accordance with embodiments of the present disclosure.

FIG. 4 depicts data structure 400 in accordance with embodiments of the present disclosure. In one embodiment, data structure 400 defines one or more records maintained in a data storage, such as a memory, database, "cloud" storage, etc., to maintain records of a persona, such as first persona 208 (see FIGS. 2-3). Fields in data structure 400 are variously embodied and may include one or more of identifier 402 (e.g., "delta", "27 year old female with an east coast accent," "agent_03", etc.), appearance 404 (e.g., a particular age, gender, clothing, facial expression, etc.), pattern of speech (e.g., rushed, formal, authoritative, demure, etc.), word choice (e.g., formal words, informal words, idioms, etc.), vocalized utterances (e.g., "ah," "hmm", etc.), operations (e.g., "to go back say 'back'", "to go back say 'previous'", etc.), and/or other elements that are presented to a customer during an interaction.

In one embodiment, a record built on data structure 400 defines a persona of an artificial agent and may be transferred to a subsequent agent, such as another artificial agent or a system altering the persona presented by a live agent. Records may be transmitted from system to system, copied, or stored in a common location wherein only an index or other identifier of a particular record, such as identifier 402, is provided to enable a subsequent system to access the persona.

Figure 5:
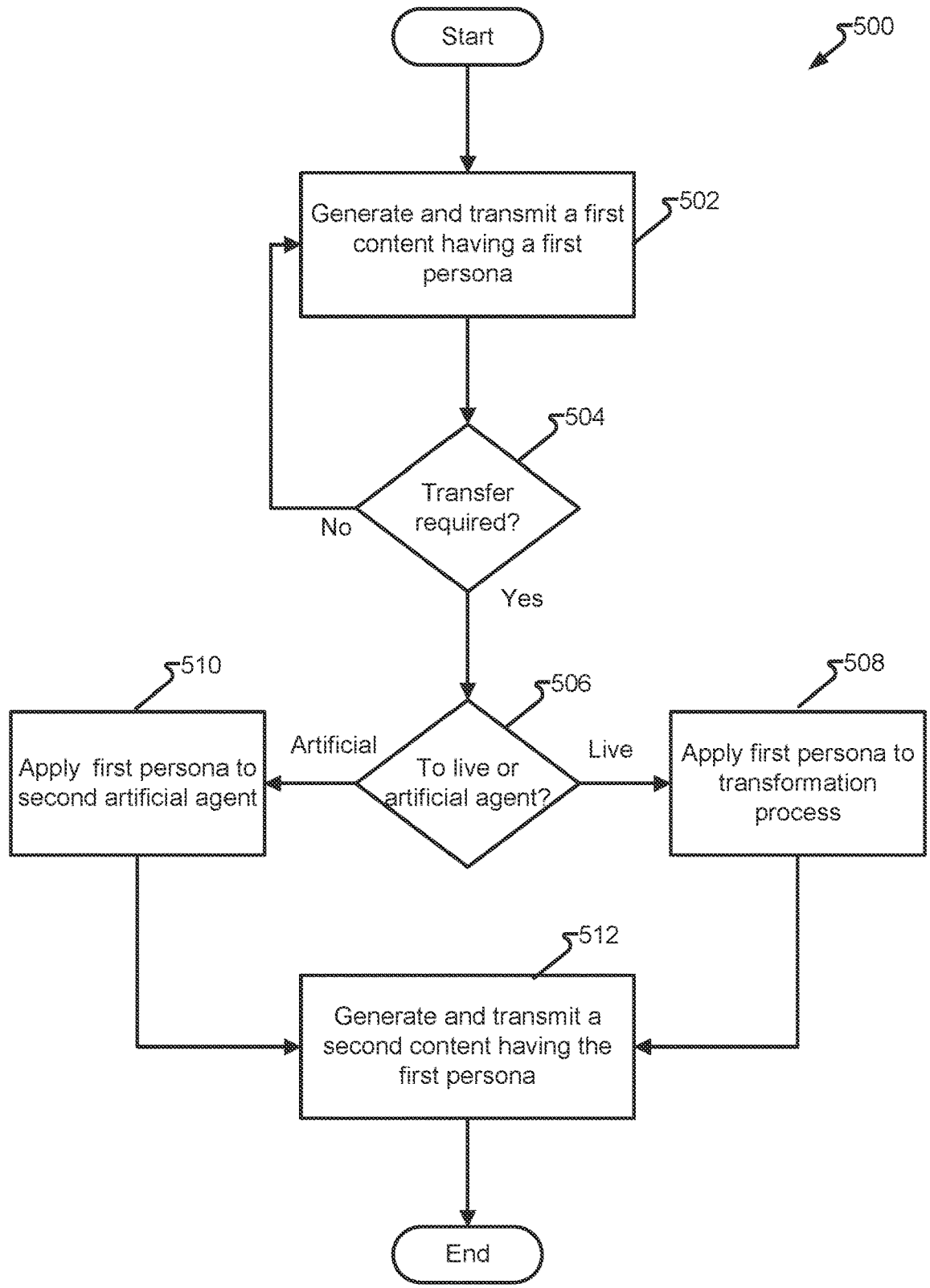
FIG. 5 depicts a process in accordance with embodiments of the present disclosure.

FIG. 5 depicts process 500 in accordance with embodiments of the present disclosure. Process 500 may be embodied as machine-readable instructions maintained in a non-transitory memory that when read by a machine, such as a processor of one or more of first artificial agent 206, second artificial agent 216, and/or other electronic computing device, cause the machine to execute the instructions of process 500.

Process 500 begins and a first communication content is generated and transmitted to a customer, such as first artificial agent 206 generating a portion of first interaction 210 for transmission via network 104 to customer communication device 108 and wherein the first communication content is generated to comprise a first persona, such as first persona 208 (see FIG. 2). During the interaction with the customer, test 504 may be executed one or more times to determine if the interaction needs to be transferred to another resource 112. For example, test 504 may determine that a work item cannot be positively determined, the work item requires an action not authorized, the work item requires access to data and/or logic not available, progress has stalled, the customer has a negative emotional state, etc. If test 504 is determined in the negative, process 500 loops back to step 502 and the first interaction may end if successfully addressed. However, if the interaction cannot be successfully addressed, test 504 will be determined in the affirmative and processing continues to test 506 which determines a particular resource 112 to continue the interaction.

Test 506 may determine whether routing to a subsequent agent will be to an artificial agent or live agent and may optionally determine a particular artificial or live agent from a plurality thereof. Test 506 may be determined by process 500 alone or in conjunction with routing engine 132, work assignment mechanism 116, work assignment engine 120, and/or other components (see FIG. 1). If test 506 determines the resource needed to successfully resolve the interaction (e.g., one or more work items) or a portion thereof is an artificial agent, processing continues to step 510. Step 510 configures a second artificial agent with the first persona utilized in step 502. If test 506 determines a live agent is needed to successfully resolve the interaction or a portion thereof, processing continues to step 508 wherein a translation server is configured with the first persona wherein the inherent persona of the live agent is altered to comport to the persona utilized in step 502. Step 512 then generates content, which comprises a processor executing a second artificial agent when step 510 is executed, to comprise the first persona and thereby supersede the native or any other persona that would otherwise be provided by the second artificial agent. Step 512 generates the content to comprise the first persona, when step 508 is executed, to alter the inherent persona of the live agent so as to comprise the first persona when presented to the customer.

Figure 6:
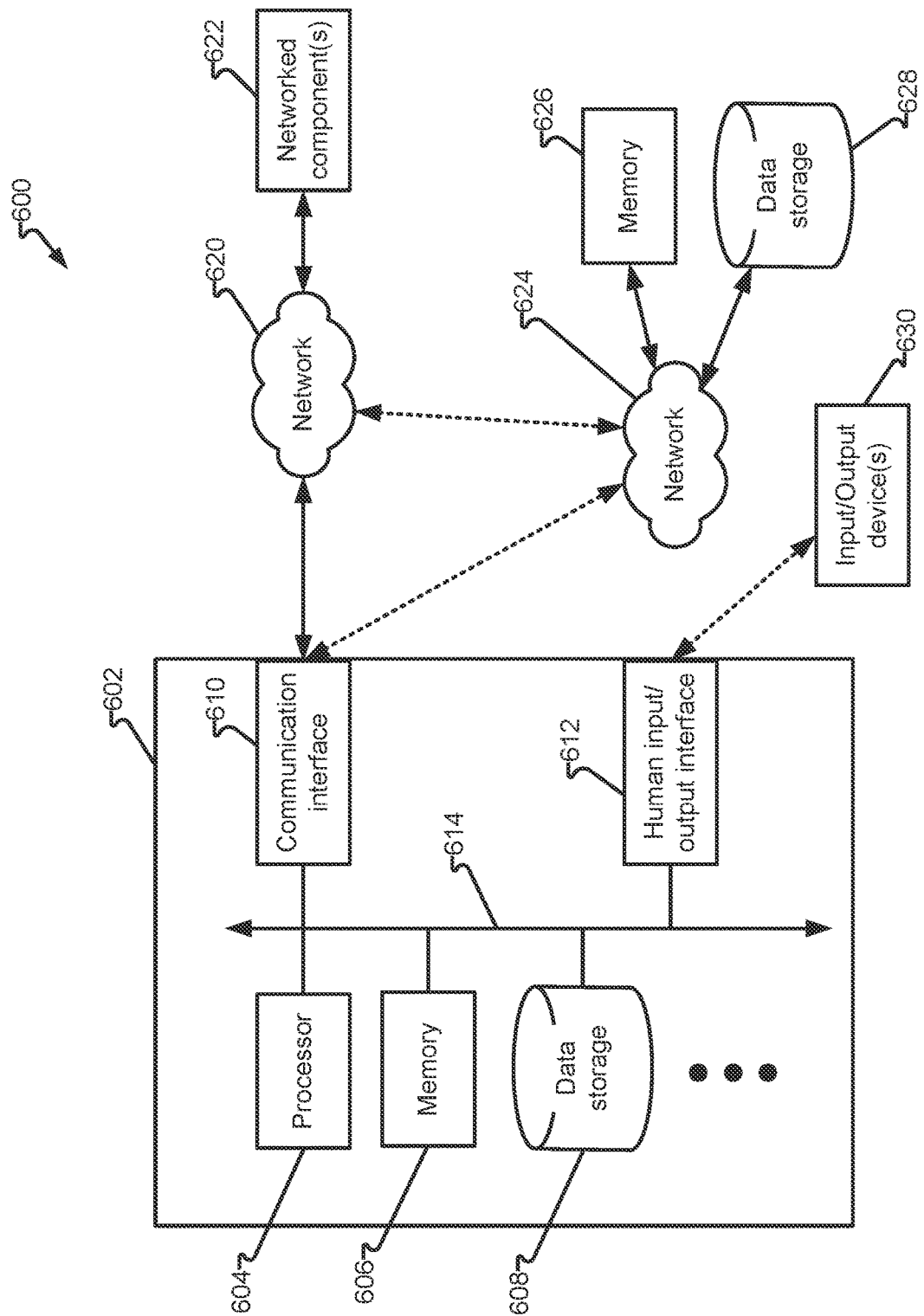
FIG. 6 depicts a system in accordance with embodiments of the present disclosure.

FIG. 6 depicts device 602 in system 600 in accordance with embodiments of the present disclosure. In one embodiment, first artificial agent 206, second artificial agent 216, and server 312 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, such as contact center 102, whereby components are trusted (or at least more so) than networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. As another example, memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 108, may be enabled (or disabled) with a particular networked component 622 and/or particular resource 112. Similarly, one particular networked component 622 and/or resource 112 may be enabled (or disabled) from communicating with a particular other networked component 622 and/or resource 112, including, in certain embodiments, device 602 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel®

Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIVI926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for harmonizing a communication, comprising:
   a network interface to a network;
   a processor with instructions maintained in a non-transitory memory; and
   wherein the processor performs:
      generating, by a first artificial agent, a first communication content and transmitting the first communication content, via the network, as a first portion of an interaction with a customer device utilized by a customer and wherein the first communication content comprises substantive content and a first persona;
      during the interaction, determining that the first artificial agent is unable to successfully address a work item to be addressed during the interaction and, in response, transferring the interaction to a second agent;
      generating, by the second agent, a second communication content as a second portion of the interaction and wherein the second agent generates the second communication content comprising a second persona; and
      altering the second communication content to comprise the first persona and transmitting the second communication content, via the network, comprising the first persona to the customer device.

2. The system of claim 1, wherein the first persona differs from the second persona in at least a physical appearance in a video portion of the second communication content.

3. The system of claim 2, wherein the physical appearance is a gesture.

4. The system of claim 1, wherein the first persona differs from the second persona in at least a pattern of speech in an audio portion of the second communication content.

5. The system of claim 1, wherein the first persona differs from the second persona in at least a word chosen to express a meaning as a portion of the second communication content.

6. The system of claim 1, wherein the first persona differs from the second persona in at least a vocalized utterance in an audio portion of the second communication content.

7. The system of claim 1, wherein the first persona is maintained as a data structure maintained in a data storage.

8. The system of claim 7, wherein the processor configures a second system hosting the second agent with the first persona.

9. The system of claim 1, wherein the second agent comprises at least one of audio and video signals generated from a corresponding at least one of speech and physical presence of a live agent.

10. A method for harmonizing a communication, comprising:
    generating a first communication content and transmitting the first communication content, via a network, as a first portion of an interaction with a customer device utilized by a customer and wherein the first communication content comprises substantive content and a first persona;
    during the interaction, determining that a first artificial agent is unable to successfully address a work item to be addressed during the interaction and, in response, transferring the interaction to a second agent;

generating, by the second agent, a second communication content as a second portion of the interaction and wherein the second agent generates the second communication content comprising a second persona; and altering the second communication content to comprise the first persona and transmitting the second communication content, via the network, comprising the first persona to the customer device.

11. The method of claim 10, wherein the first persona differs from the second persona in at least a physical appearance in a video portion of the second communication content.

12. The method of claim 11, wherein the physical appearance is a gesture.

13. The method of claim 10, wherein the first persona differs from the second persona in at least a pattern of speech in an audio portion of the second communication content.

14. The method of claim 10, wherein the first persona differs from the second persona in at least a word chosen to express a meaning as a portion of the second communication content.

15. The method of claim 10, wherein the first persona differs from the second persona in at least a vocalized utterance in an audio portion of the second communication content.

16. The method of claim 10, wherein the first persona is maintained as a data structure maintained in a data storage.

17. The method of claim 16, wherein a processor configures a second system hosting the second agent with the first persona.

18. The method of claim 10, wherein the second agent comprises at least one of audio and video signals generated from a corresponding at least one of speech and physical presence of a live agent.

19. A system, comprising:
means to generate a first communication content and transmitting the first communication content, via a network, as a first portion of an interaction with a customer device utilized by a customer and wherein the first communication content comprises substantive content and a first persona;
means to, during the interaction, determine that a first artificial agent is unable to successfully address a work item to be addressed during the interaction and, in response, transfer the interaction to a second agent;
means to generate, by the second agent, a second communication content as a second portion of the interaction and wherein the second agent generates the second communication content comprising a second persona; and
means to alter the second communication content to comprise the first persona and transmit the second communication content, via the network, comprising the first persona to the customer device.

20. The system of claim 19, further comprising:
means to maintain the first persona in a data storage; and
means to configure a server executing the second communication content with the second persona and alter the first persona to comprise the second persona.

* * * * *